(12) United States Patent
Yamazaki et al.

(10) Patent No.: US 9,970,082 B2
(45) Date of Patent: May 15, 2018

(54) HEAT-RESISTANT ALLOY AND METHOD OF MANUFACTURING THE SAME

(71) Applicant: A.L.M.T.CORP., Minato-ku, Tokyo (JP)

(72) Inventors: Shigekazu Yamazaki, Toyama (JP); Ayuri Tsuji, Toyama (JP); Masahiro Katoh, Toyama (JP); Akihiko Ikegaya, Toyama (JP)

(73) Assignee: A.L.M.T.CORP., Tokyo (JP)

( * ) Notice: Subject to any disclaimer, the term of this patent is extended or adjusted under 35 U.S.C. 154(b) by 425 days.

(21) Appl. No.: 14/365,764

(22) PCT Filed: Dec. 13, 2012

(86) PCT No.: PCT/JP2012/082319
§ 371 (c)(1),
(2) Date: Jun. 16, 2014

(87) PCT Pub. No.: WO2013/089177
PCT Pub. Date: Jun. 20, 2013

(65) Prior Publication Data
US 2014/0356215 A1    Dec. 4, 2014

(30) Foreign Application Priority Data

Dec. 16, 2011 (JP) .................... 2011-275971

(51) Int. Cl.
*C22C 27/04* (2006.01)
*C22C 1/04* (2006.01)
(Continued)

(52) U.S. Cl.
CPC ............ *C22C 27/04* (2013.01); *B22F 3/1003* (2013.01); *B22F 3/15* (2013.01); *B23K 20/1255* (2013.01);
(Continued)

(58) Field of Classification Search
CPC ................. C22C 27/04; C22C 29/04
(Continued)

(56) References Cited

U.S. PATENT DOCUMENTS 4,145,213 A * 3/1979 Oskarsson ............. C22C 29/00
75/238
4,704,372 A    11/1987 Watanabe et al.
(Continued)

FOREIGN PATENT DOCUMENTS

| | | |
|---|---|---|
| EP | 1918059 A1 | 5/2008 |
| JP | 8-170141 A | 7/1996 |
| JP | 2008-114258 A | 5/2008 |
| JP | 2008-246553 A | 10/2008 |
| JP | 2013-249512 A | 12/2013 |
| WO | 9622402 A1 | 7/1996 |

OTHER PUBLICATIONS

Communication dated Dec. 24, 2015 from the Japanese Patent Office in counterpart application No. 2013-549308.
(Continued)

*Primary Examiner* — Weiping Zhu
(74) *Attorney, Agent, or Firm* — Sughrue Mion, PLLC

(57) ABSTRACT

A heat-resistant alloy that satisfies physical properties such as proof stress and hardness adapted to an increase in the melting point of a welding object compared to conventional alloys is provided. The heat resistant alloy includes a first phase, as a main component, containing a Mo or W metal phase, a second phase containing a Mo—Si—B—based alloy, and a third phase containing titanium carbonitride, wherein the balance is inevitable compounds and inevitable impurities.

22 Claims, 5 Drawing Sheets

(51) Int. Cl.
    C22C 32/00    (2006.01)
    B23K 20/12    (2006.01)
    B22F 3/10     (2006.01)
    B22F 3/15     (2006.01)
    C22C 1/05     (2006.01)
    C22C 29/04    (2006.01)
    C22C 29/14    (2006.01)
    B22F 5/00     (2006.01)

(52) U.S. Cl.
    CPC ............ C22C 1/045 (2013.01); C22C 1/051 (2013.01); C22C 29/04 (2013.01); C22C 29/14 (2013.01); C22C 32/0047 (2013.01); C22C 32/0052 (2013.01); *B22F 2005/002* (2013.01); *B22F 2998/10* (2013.01); *B22F 2999/00* (2013.01)

(58) Field of Classification Search
    USPC ....................................................... 420/429
    See application file for complete search history.

(56) References Cited

U.S. PATENT DOCUMENTS

| | | | | |
|---|---|---|---|---|
| 4,962,070 | A | * | 10/1990 | Sullivan ................. C04B 35/80 428/367 |
| 5,595,616 | A | * | 1/1997 | Berczik ................. C22C 27/04 148/538 |
| 7,767,138 | B2 | | 8/2010 | Jehanno et al. |
| 2008/0128472 | A1 | | 6/2008 | Park et al. |

OTHER PUBLICATIONS

"Coexistence Activity Report 2010" Graduate School of Environmental Studies, Tohoku University www.kankyo.tohoku.ac.jp. (2 pages total).

Communication dated Jun. 15, 2015, issued by the European Patent Office in counterpart Application No. 12857134.6.

Kruger M et al: "Mechanically alloyed Mo—Si—B alloys with a continuous alpha-Mo matrix and improved mechanical properties", Intermetallics, Elsevier Science Publishers B.V, GB, vol. 16, No. 7, Jul. 1, 2008 (Jul. 1, 2008), pp. 933-941, XP022733493, ISSN: 0966-9795.

Ma Qian et al: "Microstructurel evolution in the phase mixtures of Ti(C,N)-Mo at 1600 degrees C.," Materials Science and Engineering A, vol. 264, No. 1-2, May 1, 1999 (May 1, 1999), pp. 39-46, XP055193162, ISSN: 0921-5093.

R Rai et at: "Review: friction stir welding tools", Science and Technology of Welding and Joining, vol. 16, No. 4, May 1, 2011 (May 1, 2011), pp. 325-342, XP055193156, ISSN: 1362-1718.

Kyosuke Yoshimi, et al. "Microstructure and High Temperature Strength of $Mo/Mo_5SiB_2/TiC/Mo_2C$ In-situ Composites", Japan Conference on Composite Materials (JCCM), 2013, 4 pages, vol. 4.

Communication dated Oct. 6, 2015 from the European Patent Office in counterpart application No. 12857134.6.

Dennis M. Dimiduk et al: "Mo—Si—B Alloys: Developing a Revolutionary Turbine-Engine Material", M R S Bulletin, vol. 28, No. 9, Sep. 1, 2003 (Sep. 1, 2003), pp. 639-645, XP055215179, A US ISSN: 0883-7694, DOI: 10.1557/mrs2003.191.

Schneibel J H:"High temperature strength of Mo—Mo3Si—Mo5SiB2 molybdenum silicides", Intermetallics, Elsevier Science Publishers B.V, GB, vol. 11, No. 7, Jul. 1, 2003 (Jul. 1, 2003), pp. 625-632, XP004434385, ISSN: 0966-9795, DOI: 10.1016/S0966-9795(03)00044-X.

Kasonde Maweja et al: "Transformation and alloying mechanisms in sub-stoichiometric titanium carbonitrides—tungsten high energy ball milled powders", International Journal of Refractory Metals and Hard Materials, Elsevier Publishers, Barking, GB, vol. 29, No. 2, Dec. 15, 2010 (Dec. 15, 2010), pp. 312-319, XP028127616, ISSN: 0263-4368, DOI: 10.1016/J.IJRMHM.2010.12.009 [retrieved on Dec. 22, 2010].

* cited by examiner

HEAT-RESISTANT ALLOY AND METHOD OF MANUFACTURING THE SAME

CROSS REFERENCE TO RELATED APPLICATIONS

This application is a National Stage of International Application No. PCT/JP2012/082319, filed on Dec. 13, 2012, which claims priority from Japanese Patent Application No. 2011-275971, filed on Dec. 16, 2011, the contents of all of which are incorporated herein by reference in their entirety.

TECHNICAL FIELD

This invention relates to a heat-resistant alloy and a method of manufacturing the same.

BACKGROUND ART

A Mo-based alloy is known as a material for use as a heat-resistant member particularly in a high-temperature environment, such as a friction stir welding tool, a glass melting jig tool, a high-temperature industrial furnace member, a hot extrusion die, a seamless tube manufacturing piercer plug, an injection molding hot runner nozzle, a casting insert mold, a resistance heating deposition container, an airplane jet engine, or a rocket engine.

In order to improve mechanical properties and oxidation resistance at a high temperature, various compounds or the like are added to Mo to thereby obtain Mo-based alloys.

There is known as an additive a Mo—Si—B-based alloy such as $Mo_5SiB_2$ and there is known a Mo-based alloy with a two-phase mixed structure obtained by adding this Mo—Si—B-based alloy to Mo (Patent Document 1).

Further, there is also known a Mo-based alloy obtained by adding a titanium, zirconium, or hafnium carbide ceramic to Mo (Patent Document 2).

Further, it is described to manufacture a Mo alloy containing a Mo—Si—B-based compound by mechanically alloying a Mo powder, a Si powder, and a B powder and then compacting and heat-treating them (Patent Document 3).

PRIOR ART DOCUMENT

Patent Document

Patent Document 1: JP-A-2008-114258
Patent Document 2: JP-A-2008-246553
Patent Document 3: U.S. Pat. No. 7,767,138

SUMMARY OF THE INVENTION

Problem to be Solved by the Invention

Herein, for example, with respect to friction stir welding, a welding object has been gradually changing from Al, which was widely used conventionally, to a metal with a higher melting point such as a Fe-based alloy, a FeCr-based alloy (stainless), or a Ti-based alloy in recent years. Therefore, a friction stir welding component is required to have higher proof stress and hardness adapted to the increase in melting point.

However, there has been a problem that the alloys of the above-mentioned documents each have a 0.2% proof stress of about 100 MPa at 1300° C. and thus that none of them satisfy physical properties such as proof stress and hardness adapted to such an increase in the melting point of the welding object.

In view of this, surface coating is carried out. However, if the proof stress or hardness of an alloy as a base member is low, there is a possibility of the occurrence of peeling of a coating film due to deformation of a tool.

This invention has been made in view of the above-mentioned problems and it is an object of this invention to provide a heat-resistant alloy that satisfies physical properties such as proof stress and hardness adapted to an increase in the melting point of a welding object compared to conventional alloys.

Means for Solving the Problem

In order to solve the above-mentioned problems, a first aspect of this invention is a heat-resistant alloy characterized by comprising a metal binder phase (first phase) containing at least one of metal elements of Mo and W, a compound phase (second phase) containing a Mo—Si—B-based intermetallic compound, and a hard grain phase (third phase) containing titanium carbonitride, wherein the balance is an inevitable compound and an inevitable impurity.

A second aspect of this invention is a friction stir welding tool characterized by using the heat-resistant alloy according to the first aspect.

A third aspect of this invention is a friction stir welding tool characterized by having, on a surface of the friction stir welding tool according to the second aspect, a coating layer made of at least one or more kinds of elements selected from the group consisting of Group IVa elements, Group Va elements, Group VIa elements, Group IIIb elements, and Group IVb elements other than C of the Periodic Table or a carbide, a nitride, or a carbonitride of at least one or more kinds of elements selected from the element group.

A fourth aspect of this invention is a friction stir apparatus characterized by comprising the friction stir welding tool according to the second or third aspect.

A fifth aspect of this invention is a method of manufacturing the heat-resistant alloy according to the first aspect, comprising a mixing step of mixing together a Mo powder, a Mo—Si—B-based compound powder, and a titanium carbonitride powder, a molding step of compression-molding at room temperature a mixed powder obtained by the mixing step, a sintering step of heating a compact, obtained by the molding step, at 1600° C. or more and 1820° C. or less in a reduced-pressure atmosphere containing at least nitrogen; and a pressing step of hot-isostatic-pressing (hereinafter, called "HIP") in an inert atmosphere a sintered body obtained by the sintering step.

Further, a sixth aspect of this invention is a method of manufacturing the heat-resistant alloy according to the first aspect, which is characterized by comprising a mixing step of mixing together a Mo or W powder, a Mo—Si—B-based alloy powder, and a titanium carbonitride powder and a sintering step of, while pressing a mixed powder, obtained by the mixing step, at 30 MPa or more and 70 MPa or less in a reduced-pressure atmosphere or a hydrogen or inert atmosphere, heating the mixed powder at 1600° C. or more and 1900° C. or less when manufacturing the alloy by mixing the Mo—Si—B-based alloy powder and the titanium carbonitride powder into the Mo powder or heating the mixed powder at 1700° C. or more and 2000° C. or less when manufacturing the alloy by mixing the Mo—Si—B-based alloy powder and the titanium carbonitride powder into the W powder.

Effect of the Invention

According to this invention, it is possible to provide a heat-resistant alloy that satisfies physical properties such as proof stress and hardness adapted to an increase in the melting point of a welding object compared to conventional alloys.

MODE FOR CARRYING OUT THE INVENTION

Figure 1:
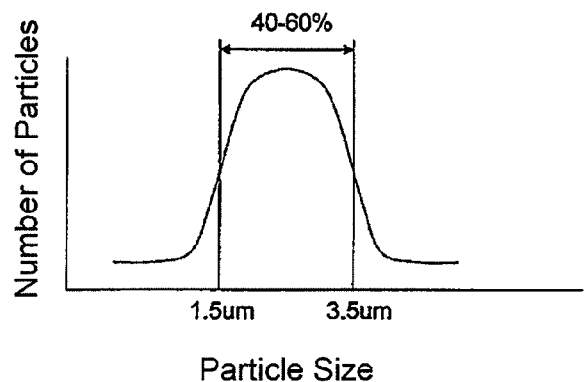
FIG. 1 is a diagram showing the grain size distribution of titanium carbonitride grains in a heat-resistant alloy of this invention.

Hereinbelow, a preferred embodiment of this invention will be described in detail with reference to the drawings.

<Heat-Resistant Alloy Composition>

First, the composition of a heat-resistant alloy of this invention will be described.

The heat-resistant alloy of this invention comprises a metal binder phase containing at least one of metal elements of Mo and W, a compound phase containing a Mo—Si—B-based intermetallic compound, and a hard grain phase containing titanium carbonitride, wherein the balance is an inevitable compound and an inevitable impurity.

Hereinbelow, the respective phases will be described.

Mo or W is essential because it has a high melting point and high hardness and is excellent in strength at a high temperature and because it imparts physical properties of a metal to the heat-resistant alloy.

The content of Mo or W is determined by the relationship with the ratios of other elements which will be described later. In order to impart physical properties of a metal to the heat-resistant alloy, Mo or W is preferably at least a main component, i.e. an element whose content is highest, while, it is not necessarily a main component when wear resistance is further imparted to the heat-resistant alloy.

The Mo—Si—B-based compound is essential because the hardness and the 0.2% proof stress at a high temperature can be increased by adding it to Mo.

As the Mo—Si—B-based compound, there can be cited, for example, a compound composed mainly of $Mo_5SiB_2$, but not necessarily limited thereto.

Further, even in the case where $Mo_5SiB_2$ is used, the component ratio is not necessarily complete. For example, even if a compound containing at least two or more kinds of Mo, Si, and B, such as $Mo_3Si$ or $Mo_2B$, is present as a later-described inevitable compound, if $Mo_5SiB_2$ is a main component, the effect of this invention can be obtained.

However, if the $Mo_5SiB_2$ content is less than 5 mass %, the effect of increasing the room-temperature hardness and the high-temperature 0.2% proof stress cannot be obtained. On the other hand, if the $Mo_5SiB_2$ content exceeds 80 mass % in the case of the Mo metal binder phase or if the $Mo_5SiB_2$ content exceeds 75 mass % in the case of the W metal binder phase, the volume ratio of the metal binder phase comprising Mo or W becomes so small that the sinterability is degraded to make it unable to obtain sufficient density, resulting in that the required mechanical strength cannot be obtained.

Therefore, the $Mo_5SiB_2$ content is preferably 5 mass % or more and 80 mass % or less in the case of the Mo metal binder phase and is preferably 5 mass % or more and 75 mass % or less in the case of the W metal binder phase.

In order to increase the room-temperature hardness and 0.2% proof stress of the sintered body, the $Mo_5SiB_2$ content is more preferably 10 mass % or more and 60 mass % or less and further preferably 20 mass % or more and 50 mass % or less in the case of the Mo metal binder phase. On the other hand, in the case of the W metal binder phase, the $Mo_5SiB_2$ content is more preferably 10 mass % or more and 30 mass % or less.

As described above, the alloy with excellent properties of this invention can be obtained over the wide range in terms of the additive such that the $Mo_5SiB_2$ content is 5 mass % or more and 80 mass % or less in the case of the Mo metal binder phase and is 5 mass % or more and 75 mass % or less in the case of the W metal binder phase. Therefore, there is also an advantage in that it is easy to control the addition amount of $Mo_5SiB_2$ in the manufacture of the alloy.

The titanium carbonitride is essential because the room-temperature hardness and high-temperature 0.2% proof stress of the alloy can be made higher than those of a heat-resistant alloy comprising only two phases of Mo and a Mo—Si—B-based alloy by adding it to the heat-resistant alloy and because it is a chemically stable ceramic among Ti-based ceramics.

However, if the titanium carbonitride content is less than 1 mass % in the case of the Mo metal binder phase or if the titanium carbonitride content is less than 0.5 mass % in the case of the W metal binder phase, the effect of increasing the room-temperature hardness and the high-temperature 0.2% proof stress cannot be obtained. On the other hand, if the titanium carbonitride content exceeds 80 mass % in the case of the Mo metal binder phase or if the titanium carbonitride content exceeds 75 mass % in the case of the W metal binder phase, the volume ratio of the metal binder phase comprising Mo or W becomes so small that the sinterability is degraded to make it unable to obtain sufficient density, resulting in that the required mechanical strength cannot be obtained.

Therefore, the titanium carbonitride content is preferably 1 mass % or more and 80 mass % or less in the case of the Mo metal binder phase and is preferably 0.5 mass % or more and 75 mass % or less in the case of the W metal binder phase.

In order to increase the room-temperature hardness and 0.2% proof stress of the sintered body, the titanium carbonitride content is more preferably 3 mass % or more and 25 mass % or less and further preferably 10 mass % or more and 25 mass % or less in the case of the Mo metal binder phase. On the other hand, in the case of the W metal binder phase, the titanium carbonitride content is more preferably 5 mass % or more and 16 mass % or less.

As described above, the alloy with excellent properties of this invention can be obtained over the wide range in terms of the additive such that the titanium carbonitride content is 1 mass % or more and 80 mass % or less in the case of the Mo metal binder phase and is 0.5 mass % or more and 75 mass % or less in the case of the W metal binder phase. Therefore, there is also an advantage in that it is easy to control the addition amount of titanium carbonitride in the manufacture of the alloy.

The titanium carbonitride of this invention is defined as $TiC_xN_{1-x}$ (x=0.3 to 0.7) and, specifically, $TiC_{0.3}N_{0.7}$, $TiC_{0.5}N_{0.5}$, $TiC_{0.7}N_{0.3}$, and so on can be cited. While $TiC_{0.5}N_{0.5}$ is known as typical, titanium carbonitrides of other compositions are also hard ceramics and the same effect can be obtained as $TiC_{0.5}N_{0.5}$. Hereinafter, TiCN and $TiC_xN_{1-x}$ (x=0.3 to 0.7) will each be referred to as titanium carbonitride. Further, herein, $TiC_{0.5}N_{0.5}$ will be abbreviated and referred to as TiCN5 and, likewise, $TiC_{0.3}N_{0.7}$ and $TiC_{0.7}N_{0.3}$ will be respectively referred to as TiCN3 and TiCN7.

The heat-resistant alloy according to this invention may contain inevitable compounds and inevitable impurities in addition to the above-mentioned essential components.

As the inevitable impurities, there are metal components such as Fe, Ni, Cr, Si, and B, C, N, O, and so on.

As the inevitable compounds, there are compounds each containing at least two or more kinds of Si, B, and Mo, $Mo_2C$, and so on. Specifically, when, for example, $Mo_5SiB_2$ is used as a main component of the Mo—Si—B-based alloy, there are MoB, $Mo_3Si$, and $Mo_5Si_3$. These compounds may be contained due to a $Mo_5SiB_2$ powder used as a material. $Mo_2C$ may be formed by reaction of carbon from a general organic binder which is mixed/added for shape retainability in powder molding, free carbon in the titanium carbonitride, or the like with Mo, $Mo_5SiB_2$, or the like as an alloy material powder.

For example, when $Mo_5SiB_2$ is used as the main component of the Mo—Si—B-based alloy, these inevitable compounds do not affect the room-temperature hardness and the high-temperature 0.2% proof stress, which are the function and effect of this invention, if the $Mo_2C$ (101) peak intensity is 6.5% and the $Mo_3Si$ (211) peak intensity is about 1.7% relative to the Mo strongest line peak (110) intensity.

<Grain Size>

Next, the grain sizes of the respective phases forming the heat-resistant alloy will be described.

[Titanium Carbonitride]

The average grain size of the titanium carbonitride in the heat-resistant alloy of this invention is preferably 0.5 µm or more and 11 µm or less. This is for the following reasons.

First, the reason for setting the average grain size to 0.5 µm or more will be described.

If the average grain size is set to be less than 0.5 µm, the average grain size of a titanium carbonitride powder to be mixed should be less than 0.5 µm. However, in general, the presence of such fine grains tends to easily cause aggregation and aggregated secondary grains tend to form remarkably coarse grains by sintering and to facilitate the formation of pores. In order to prevent the formation of such remarkably coarse grains, the sintering temperature should be lowered. However, the lowering of the sintering temperature causes a reduction in the density of the sintered body.

Therefore, the average grain size of the titanium carbonitride is preferably 0.5 µm or more.

Next, the reason for setting the average grain size to 11 µm or less will be described.

If the average grain size of the titanium carbonitride in the alloy is set to be greater than 11 µm, coarse titanium carbonitride grains hinder sintering so that the sintering yield is extremely poor, which cannot be said to be industrial. Further, even if sintered, there is a problem that the coarse titanium carbonitride grains serve as the starting point of breakdown to reduce the mechanical strength.

Therefore, the average grain size of the titanium carbonitride is preferably 11 µm or less.

In terms of increasing the density of the sintered body and ensuring the uniformity of the sintered body, the average grain size of the titanium carbonitride is more preferably 0.5 to 7 µm and further preferably 0.5 to 5 µm.

Although details will be described later, the average grain size referred to herein is a value obtained by the line intercept method.

As shown in FIG. 1, the titanium carbonitride grains in the alloy are preferably such that the ratio of the number of the titanium carbonitride grains of 1.5 to 3.5 µm is 40 to 60% of all the titanium carbonitride grains in the alloy. This is because while the average grain size of the titanium carbonitride grains is preferably 0.5 to 5 µm as described above, when the grain sizes show an approximately normal distribution, if the grain size distribution is too broad, there is a possibility of leading to nonuniformity of the structure of the sintered body, i.e. nonuniformity in properties with respect to portions of the sintered body, and on the other hand because it is difficult to obtain a powder with a highly uniform grain size, leading to a disadvantage in terms of the manufacturing cost.

Figure 2:
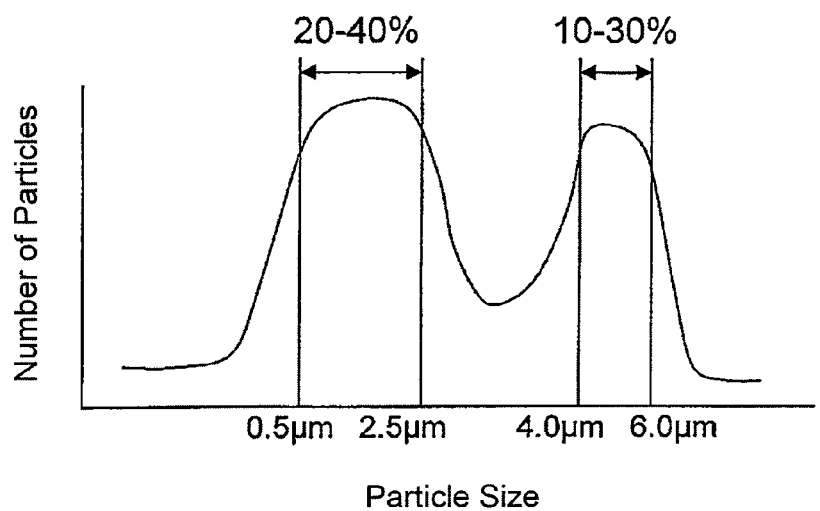
FIG. 2 is a diagram showing the grain size distribution of titanium carbonitride grains in a heat-resistant alloy of this invention.

Further, the titanium carbonitride grains can further enhance the effect of the addition thereof by mixing fine grains and coarse grains together. Specifically, as shown in FIG. 2, it is more preferable that the ratio of the number of the titanium carbonitride grains with grain sizes of 0.5 to 2.5 µm be 20 to 40% of all the titanium carbonitride grains in the alloy and that the ratio of the number of the titanium carbonitride grains with grain sizes of 4.0 to 6.0 µm be 10 to 30% of all the titanium carbonitride grains in the alloy. With this distribution, the titanium carbonitride grains of 0.5 µm to 2.5 µm on the fine grain side are mainly located at the grain boundaries of Mo or W to increase the Mo or W grain boundary strength (effect A) while the titanium carbonitride grains of 4.0 to 6.0 µm on the coarse grain side contribute to the effect of increasing the hardness of the entire bulk of the heat-resistant alloy (effect B).

If the ratio of the number of the titanium carbonitride grains with grain sizes of 0.5 to 2.5 µm is less than 20%, the ratio of the coarse grains becomes so high that the effect A is difficult to obtain while if it is greater than 40%, the ratio of the fine grains becomes so high that the effect B is difficult to obtain, which is thus not preferable.

If the ratio of the number of the titanium carbonitride grains with grain sizes of 4.0 to 6.0 µm is less than 10%, the ratio of the coarse grains becomes so small that the effect B is difficult to obtain while if it is greater than 30%, the ratio of the coarse grains becomes so high that the effect A is difficult to obtain, which is thus not preferable.

[Mo—S—B—Based Alloy]

The Mo—Si—B—based alloy in the heat-resistant alloy of this invention is preferably composed mainly of $Mo_5SiB_2$ and preferably has an average grain size of 0.5 µm or more and 20 µm or less. This is because, as in later-described Examples, it is difficult to industrially manufacture a heat-resistant alloy in which the average grain size of a Mo—Si—B-based alloy is less than 0.5 μm or more than 20 μm.

<Physical Properties>

Next, the physical properties of the heat-resistant alloy will be described.

The strength of the heat-resistant alloy of this invention is such that the Vickers hardness at 20° C. (room-temperature hardness) is 500 Hv or more, that the 0.2% proof stress at 1200° C. is 500 MPa or more, and that the bending strength at 1200° C. is 600 MPa or more when the Vickers hardness (room-temperature hardness) is 850 Hv or more.

With these physical properties, the heat-resistant alloy can be applied to a heat-resistant member, which is required to have a high melting point and high strength, such as, for example, a friction stir welding member for a Fe-based, FeCr-based, or Ti-based alloy or the like.

The reason that the room-temperature hardness is used as the condition is as follows.

When the heat-resistant alloy of this invention is used as a friction stir welding material, it is often used as a base member, although there is a case where it is used as a tool itself, and then is coated on its surface with a coating film made of at least one or more kinds of elements selected from the group consisting of Group IVa elements, Group Va elements, Group VIa elements, Group IIIb elements, and Group IVb elements other than C of the Periodic Table or a carbide, a nitride, or a carbonitride of at least one or more kinds of elements selected from this element group, thereby forming a tool. Herein, when the tool is actually used, first, the tool is rotated while being strongly pushed into a welding object material at room temperature, thereby raising the temperature of the welding object by frictional heat. Therefore, in order to prevent deformation or breakdown of the base member or peeling of the coating film from the base member at the beginning of the rotation, the room-temperature hardness of the base member should be high.

The conditions of the heat-resistant alloy are as described above.

<Manufacturing Method>

Next, a method of manufacturing the heat-resistant alloy of this invention will be described with reference to FIG. 3.

The method of manufacturing the heat-resistant alloy of this invention is not particularly limited as long as it can manufacture an alloy that satisfies the above-mentioned conditions. However, the following method can be given as an example.

Figure 3:
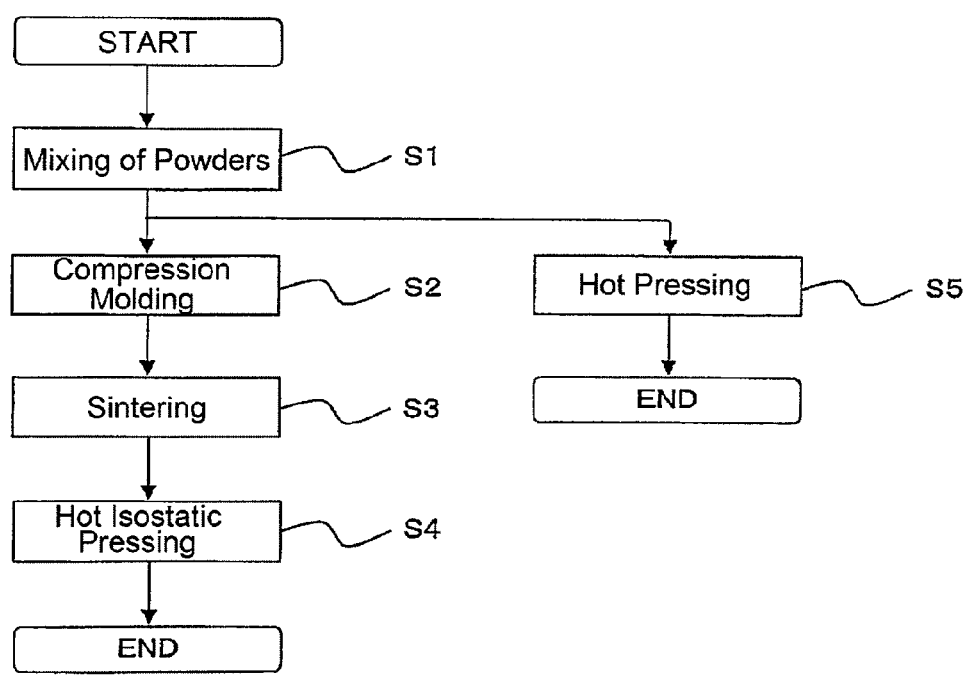
FIG. 3 is a flowchart showing a method of manufacturing a heat-resistant alloy of this invention.

First, raw material powders are mixed in a predetermined ratio to produce a mixed powder (S1 in FIG. 3).

As the raw materials, there can be cited a Mo or W powder, a Mo—Si—B-based alloy powder, and a titanium carbonitride powder. Hereinbelow, the conditions of the respective powders will be briefly described.

It is preferable to use the Mo or W powder with a purity of 99.99 mass % or more and a Fsss (Fisher Sub-Sieve Sizer) average grain size of 1.0 to 5.0 μm.

The purity of the Mo or W powder referred to herein is obtained by a molybdenum material analysis method described in JIS H 1404 and represents a metal purity exclusive of values of Al, Ca, Cr, Cu, Fe, Mg, Mn, Ni, Pb, Si, and Sn.

As the Mo—Si—B-based alloy powder, it is preferable to use a $Mo_5SiB_2$ powder and, in particular, it is preferable to use a $Mo_5SiB_2$ powder with a BET (Brunauer, Emmet and Teller) value of 0.07 to 1 m²/g.

It is preferable to use the titanium carbonitride powder with a Fsss (Fisher Sub-Sieve Sizer) average grain size of 0.5 to 5.0 μm.

An apparatus and method for use in mixing the powders are not particularly limited. For example, a known mixer such as a mortar, a V-type mixer, or a ball mill can be used.

Then, the obtained mixed powder is compression-molded to form a compact (S2 in FIG. 3).

An apparatus for use in the compression molding is not particularly limited. A known molding machine such as a uniaxial pressing machine or CIP (Cold Isostatic Pressing) may be used. As the condition in the compression, the temperature in the compression may be room temperature (20° C.).

On the other hand, the molding pressure is preferably 1 to 3 ton/cm². This is because if it is less than 1 ton/cm², the compact cannot obtain sufficient density while if it exceeds 3 ton/cm², a compression machine increases in size, which is disadvantageous in terms of the cost.

Then, the obtained compact is sintered by heating (S3 in FIG. 3).

Specifically, the compact is preferably heated at 1600° C. or more and 1820° C. or less in a reduced-pressure atmosphere containing at least nitrogen (e.g. $N_2$ atmosphere, $N_2$—Ar mixed atmosphere, $N_2$—$H_2$ mixed atmosphere, or the like).

This is because if the heating temperature is less than 1600° C., the sintering becomes insufficient, leading to a low density of a sintered body, and because if the heating temperature is higher than 1820° C., Si in the Mo—Si—B-based powder and Ti in the titanium carbonitride powder react with each other to form a low melting point compound so that a sintered body expands, leading likewise to a low density of the sintered body. The reason that an atmosphere contains at least nitrogen is that nitrogen of the titanium carbonitride is denitrified so that the sintering density decreases. While, as described above, it is preferable to use a reduced-pressure atmosphere containing at least nitrogen, if a method of setting a pressurized atmosphere, for example, a method of carrying out sintering HIP at a pressure of 10 to 50 MPa, is used in the case of a hydrogen or argon atmosphere, sintering at a low temperature is also enabled.

Then, a sintered body obtained by the above-mentioned reduced-pressure sintering is subjected to a HIP treatment in an inert atmosphere (S4 in FIG. 3).

The reason for requiring such a step is that if a high-temperature treatment (treatment at a temperature higher than 1820° C.) is carried out in the sintering step, Ti and Si react with each other to form a low melting point compound as described above and pores are formed due to this in a sintered body, that, therefore, the temperature in the sintering step cannot be set higher than 1820° C., and that, therefore, only by the sintering step in the above-mentioned temperature range, the relative density of an obtained sintered body can hardly satisfy 96% so that a high-density alloy cannot be obtained.

Accordingly, by suppressing the heating temperature in the precedent sintering step and breaking micropores, hindering higher density, in the sintered body by the HIP step, the density of the sintered body can be made high (relative density of 96% or more).

As specific pressing conditions, the HIP treatment is preferably carried out in an inert atmosphere at a temperature of 1400 to 1800° C. at a pressure of 152.0 to 253.3 MPa. This is because the density does not rise below these ranges while, above these ranges, a large machine is required, thus affecting the manufacturing cost.

Instead of the above-mentioned compression molding (S2 in FIG. 3), sintering (S3 in FIG. 3), and HIP (S4 in FIG. 3), the alloy may be manufactured by a pressure sintering step (hot pressing) shown at S5 in FIG. 3. Specifically, when the alloy is manufactured by mixing a 60 mass % or more $Mo_5SiB_2$ powder and a TiCN5 powder into a Mo powder or mixing a $Mo_5SiB_2$ powder and a TiCN5 powder into a W powder, the pressure sintering step is used.

In the pressure sintering step, the mixed powder is filled into a graphite mold and then sintered by heating while being pressed by punches in a pressure sintering machine.

As specific conditions, the heating is preferably carried out at a pressure of 30 to 70 MPa in a reduced-pressure atmosphere or a hydrogen or inert atmosphere. The heating temperature is preferably set to 1600 to 1900° C. when the 60 mass % or more $Mo_5SiB_2$ powder and the TiCN5 powder are mixed into the Mo powder, or to 1700° C. to 2000° C. when the $Mo_5SiB_2$ powder and the TiCN5 powder are mixed into the W powder.

The reason for requiring such a step is that in the case where the 60 mass % or more $Mo_5SiB_2$ powder and the TiCN5 powder are mixed into the Mo powder, if the volume ratio of a compound phase or a hard grain phase becomes high, the volume ratio of a metal binder phase becomes low so that the relative density of an obtained sintered body becomes less than 90% only by sintering in an atmosphere and thus that a high-density alloy cannot be obtained even if a HIP treatment is carried out.

The reason for the case where the $Mo_5SiB_2$ powder and the TiCN5 powder are mixed into the W powder is as follows. In the case of sintering W, it tends to be difficult to obtain a high-density sintered body compared to the case of sintering Mo. Further, when the $Mo_5SiB_2$ powder and the TiCN5 powder are added to the W powder, the relative density of an obtained sintered body becomes less than 90% only by sintering in an atmosphere and thus a high-density alloy cannot be obtained even if a HIP treatment is carried out. The method of manufacturing the heat-resistant alloy of this invention is as described above.

<Friction Stir Welding Tool Using Heat-Resistant Alloy>

The heat-resistant alloy of this invention has the structure described above. Herein, a friction stir welding tool 101 shown in FIG. 4 will be briefly described as an application example of the heat-resistant alloy of this invention.

Figure 4:
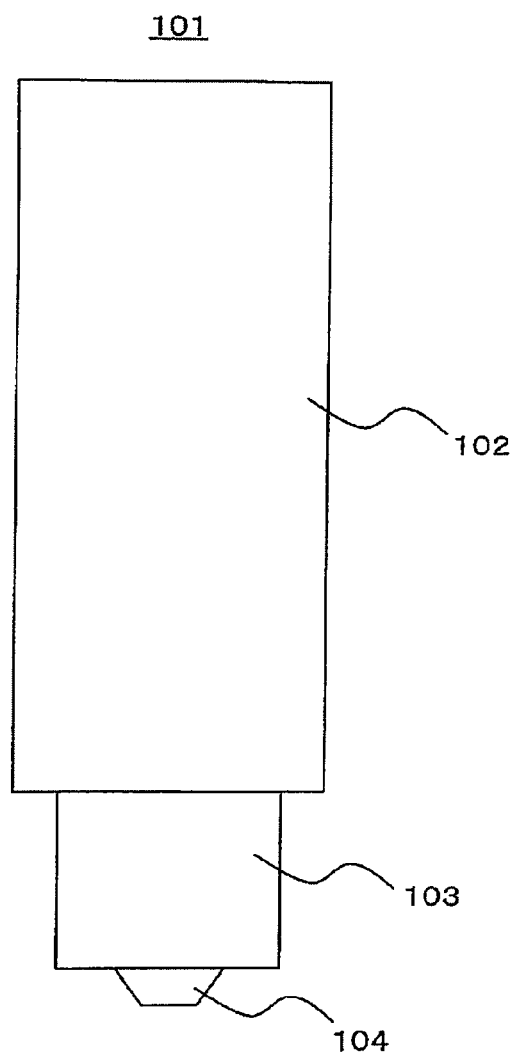
FIG. 4 is a side view showing a friction stir welding tool 101 using a heat-resistant alloy of this invention.

As shown in FIG. 4, the friction stir welding tool 101 comprises a shank 102 which is connected to a non-illustrated spindle of a welding apparatus, a shoulder portion 103 which is brought into contact with a surface of a welding object at the time of welding, and a pin portion 104 which is inserted into the welding object at the time of welding.

Among them, base members of at least the shank 102 and the pin portion 104 are formed of the heat-resistant alloy according to this invention.

In order to prevent the heat-resistant alloy from being oxidized or welded to the welding object depending on the temperature during use, the heat-resistant alloy is preferably coated on its surface with a coating film made of at least one or more kinds of elements selected from the group consisting of Group IVa elements, Group Va elements, Group VIa elements, Group Mb elements, and Group IVb elements other than C of the Periodic Table or a carbide, a nitride, or a carbonitride of at least one or more kinds of elements selected from this element group. The thickness of the coating layer is preferably 1 to 20 µm. If it is less than 1 µm, the above-mentioned effect cannot be expected. If it is more than 20 µm, excessive stress occurs, resulting in peeling of the film, and therefore, the yield is extremely degraded.

As such a coating layer, there can be cited a layer of TiC, TiN, TiCN, ZrC, ZrN, ZrCN, VC, VN, VCN, CrC, CrN, CrCN, TiAlN, TiSiN, or TiCrN, or a multilayer film including at least one or more of these layers. Herein, it is known that the composition ratio of the elements of the coating layer can be arbitrarily set. The above-mentioned TiCN is also not limited to X values of $TiC_xN_{1-x}$ (x=0.3 to 0.7) defined in this invention.

A coating layer forming method is not particularly limited and the coating film can be formed by a known method. As typical methods, there are a PVD (Physical Vapor Deposition) treatment such as sputtering, a CVD (Chemical Vapor Deposition) treatment for coating by chemical reaction, a plasma CVD treatment for coating by decomposing and ionizing a gaseous element by plasma, and so on. Any of the methods is capable of treating films from a single-layer film to a multilayer film, each of which can exhibit excellent adhesion when the heat-resistant alloy of this invention is used as the base member.

As described above, the heat-resistant alloy of this invention comprises a metal binder phase (first phase), as a main component, including a Mo or W metal phase, a compound phase (second phase) containing a Mo—Si—B—based alloy, and a hard grain phase (third phase) containing titanium carbonitride, wherein the balance is an inevitable compound and an inevitable impurity.

Therefore, the heat-resistant alloy of this invention can satisfy physical properties such as proof stress and hardness adapted to an increase in the melting point of a welding object compared to conventional alloys.

EXAMPLES

Hereinbelow, this invention will be described in further detail with reference to Examples.

Example 1

Heat-resistant alloys with different titanium carbonitride contents were manufactured and the properties of the obtained alloys were evaluated. Specific sequences were as follows.

<Manufacture of Samples>

First, a Mo powder, a W powder, a $Mo_5SiB_2$ powder, and a TiCN5 powder were prepared as raw materials. Specifically, the Mo powder had a purity of 99.99 mass % or more and an average grain size according to Fsss of 4.3 µm while a W powder had a purity of 99.99 mass % or more and an average grain size according to Fsss of 1.2 µm.

The $Mo_5SiB_2$ powder had a BET value of 0.17 m²/g.

As the TiCN5 powder, use was made of a titanium carbonitride powder/model number 5OR08 with an average grain size according to Fsss of 0.8 µmm manufactured by A.L.M.T. Corporation.

First, a description will be given of the case where an alloy is manufactured by mixing a less than 60 mass % $Mo_5SiB_2$ powder and a TiCN5 powder into a Mo powder.

First, paraffin was used as a binder for enhancing the moldability and added in an amount of 2 mass % to the total weight of the powders.

Then, these powders were mixed together in mixing ratios shown in Table 1 using a mortar to produce mixed powders and then the mixed powders were compression-molded under the conditions of a temperature of 20° C. and a molding pressure of 3 ton/cm³ using a uniaxial pressing machine, thereby obtaining compacts.

Then, the obtained compacts were heated in a hydrogen atmosphere (atmospheric pressure) at a temperature of 1600° C. to 1820° C. (for details, see later-described Table 1), thereby attempting sintering of the compacts.

Then, sintered bodies (excluding those that could not be sintered) were subjected to a HIP treatment in an Ar atmosphere at a temperature of 1600° C. at a pressure of 202.7 MPa, thereby manufacturing heat-resistant alloys.

The above is a method of manufacturing an alloy when a less than 60 mass % $Mo_5SiB_2$ powder and a TiCN5 powder are mixed into a Mo powder.

Next, a description will be given of the case where an alloy is manufactured by mixing a 60 mass % or more $Mo_5SiB_2$ powder and a TiCN5 powder into a Mo powder.

First, the raw material powders were mixed together in mixing ratios shown in Table 1 using a mortar to produce mixed powders and then the mixed powders were each filled into a graphite mold and then compressed and heated in an argon atmosphere under the conditions of a temperature of 1600 to 1900° C. and a molding pressure of 30 to 70 MPa using a hot pressing furnace with an uniaxial pressing function, thereby manufacturing heat-resistant alloys.

<Measurement of Relative Density>

Then, the relative densities of the obtained heat-resistant alloys were measured. The relative density referred to herein is a value expressed in % by dividing a density measured for a manufactured sample (bulk) by its theoretical density.

Hereinbelow, a specific measurement method will be described.

(Measurement of Bulk Density)

The bulk density was obtained by the Archimedes method. Specifically, the weights in air and water were measured and the bulk density was obtained using the following calculation formula.

bulk density=weight in air/(weight in air−weight in water)×density of water (Measurement of Theoretical Density)

First, the theoretical density of a Mo—$Mo_5SiB_2$ alloy was obtained by the following sequence.

(1) Mo, Si, and B in the bulk were measured in mass % by ICP-AES and those values were converted to mol %.

Figure 7:
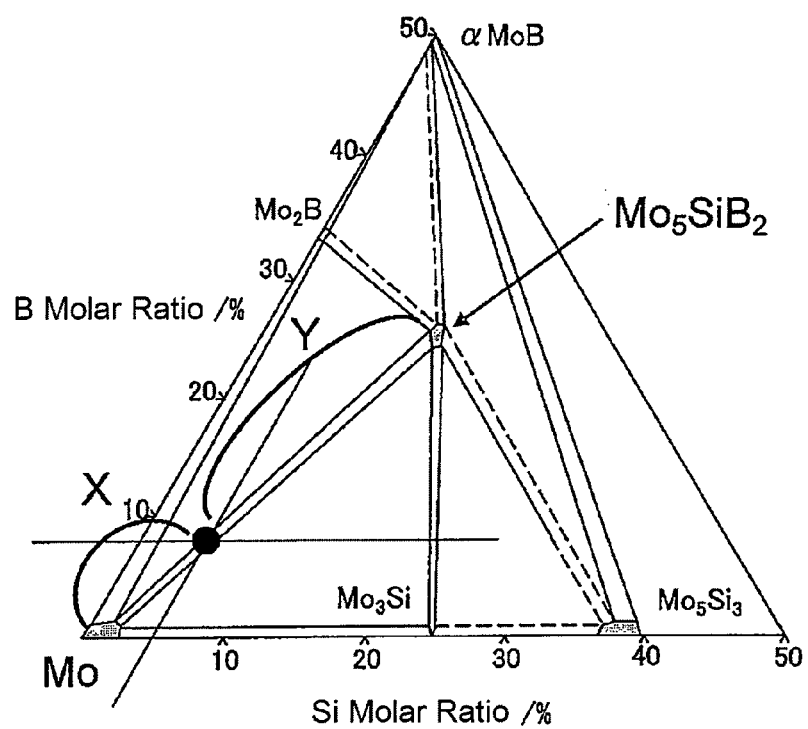
FIG. 7 is a diagram showing a Mo—Si—B ternary phase diagram (source: Nunes, C. A., Sakidja, R. & Perepezko, J. H.: Structural Intermetallics 1997, ed. by M. V. Nathal, R. Darolia, C. T. Liu, P. L. Martin, D. B. Miracle, R. Wagner and M. Yamaguchi, TMS (1997), 831-839.).

(2) A composition point in mol % of Si and B was plotted on a ternary phase diagram shown in FIG. 7 (see a black circle in FIG. 7). Since the composition of the bulk is mostly Mo and $Mo_5SiB_2$, the plotted point is on a straight line connecting between a composition point of $Mo_5SiB_2$ and a composition point of Mo 100%.

(3) As shown in FIG. 7, given that the distance between the plotted point and the composition point of Mo 100% is X and that the distance between the plotted point and the composition point of $Mo_5SiB_2$ is Y, the ratio of X and Y is converted to 100%. By this conversion, X represents a molar ratio of $Mo_5SiB_2$ and Y represents a molar ratio of Mo.

(4) The atomic weight of Mo is given as a (=95.94 g/mol), the atomic weight of $Mo_5SiB_2$ is given as b (=105.9 g/mol), the density of Mo is given as Ma (=10.2 g/cm³), and the density of a bulk member of $Mo_5SiB_2$ ideally adjusted in composition is given as Mb (=8.55 g/cm³).

(5) Herein, the mass ratio of $Mo_5SiB_2$ to Mo is expressed as follows.

$Mo_5SiB_2$:Mo=X·b:Y·a

Thus, the mass of the entire alloy is expressed as follows.

mass of entire alloy=X·b+Y·a

The volume of the entire alloy is expressed as follows.

volume of entire alloy=(X·b/Mb)+(Y·a/Ma)

Therefore, the density of the alloy is obtained by mass of entire alloy/volume of entire alloy so that theoretical density Mt=(X·b+Y·a)/[(X·b/Mb)+(Y·a/Ma)].

Then, the theoretical density of a Mo—$Mo_5SiB_2$—TiCN alloy was obtained by the following sequence.

(6) The mass ratio (0 to 1) of Ti in the bulk was obtained by ICP-AES and the mass ratios of C and N were also obtained by a chemical analysis, thereby calculating a mass ratio (Zn5) of TiCN5.

(7) The density of TiCN5 was given as Mc (=5.1 g/cm³) and the mass ratio was converted to a volume ratio.

That is, the volume ratio of TiCN5 when it was added is expressed as follows.

volume ratio of TiCN5=[Zn5Mc]/[Zn5/Mc+(1-Zn5)/Mt]

The volume ratio of Mo—$Mo_5SiB_2$ is expressed as follows.

volume ratio of Mo—$Mo_5SiB_2$=[(1-Zn5)/Mt]/[Zn5/Mc+(1-Zn5)/Mt]

(8) The theoretical density of the entire bulk was obtained by multiplying the obtained volume ratios by the densities. The theoretical density was obtained in the same manner when TiCN3 and TiCN7 were each used.

Finally, the relative density was obtained by dividing the bulk density by the theoretical density.

<Measurement of Grain Size>

Then, the grain sizes in the obtained heat-resistant alloys were measured by the following line intercept method.

Figure 5:
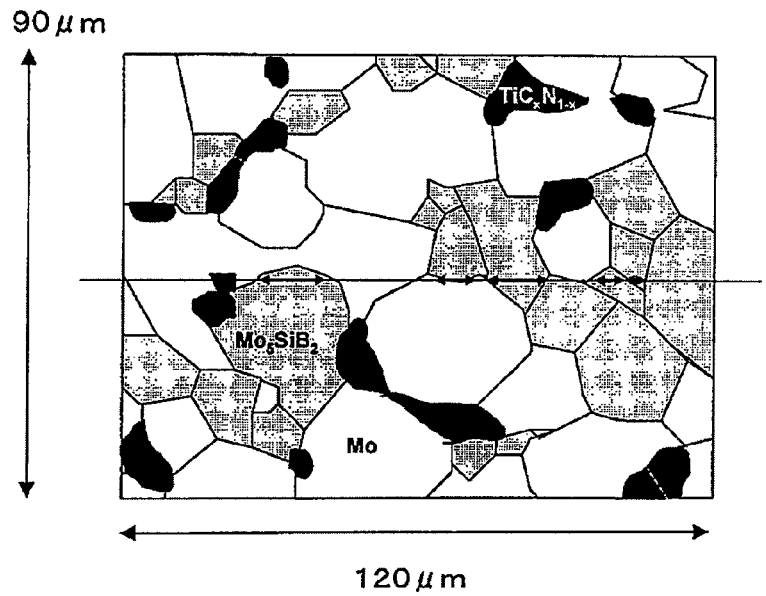
FIG. 5 is a diagram imitating an enlarged photograph of a cross section of a heat-resistant alloy according to an Example of this invention, wherein phases are colored differently.

Specifically, first, an enlarged photograph of 1000 magnifications was taken of a cross section to be measured and, on this photograph, a straight line was arbitrarily drawn as shown in FIG. 5. Then, with respect to individual crystal grains crossed by this straight line, the diameters of those crystal grains were measured and the sum of the measured diameters was calculated. Then, the average crystal grain size was obtained by the sum of the measured grain diameters and the number of the measured grains. A measurement visual field was set to 120 μm×90 μm and 50 or more grains were measured.

It was judged by an EPMA line analysis whether each of the observed crystal grains was Mo, $Mo_5SiB_2$, or TiCN5.

<Measurement of Hardness>

Using a micro Vickers hardness tester (model number: AVK) manufactured by Akashi Corporation, the Vickers hardness of each heat-resistant alloy was measured by applying a measurement load of 20 kg at 20° C. in the atmosphere. The number of measurement points was set to 5 and the average value was calculated.

<Measurement of 0.2% Proof Stress>

The 0.2% proof stress was measured by the following sequence.

First, the heat-resistant alloy was machined to a length of about 25 mm, a width of 2.5 mm, and a thickness of 1.0 mm and its surfaces were polished using #600 SiC polishing paper.

Then, the sample was set in a high-temperature universal testing machine (model number: 5867 type) manufactured by Instron Corporation so that the distance between pins was set to 16 mm. Then, a three-point bending test was conducted in an Ar atmosphere at 1200° C. by pressing a head against the sample at a crosshead speed of 1 mm/min, thereby measuring the 0.2% proof stress.

Table 1 shows test conditions and test results.

TABLE 1

| | | mixing of powders (mass %) | | | sintering | | alloy | | | |
|---|---|---|---|---|---|---|---|---|---|---|
| | | | | | temperature | pressure | relative density | room-temperature hardness | 0.2% proof stress 1200° C., | bending strength 1200° C., |
| | | Mo | Mo₅SiB₂ | TiCN5 | (° C.) | MPa | (—) | Hv | MPa | MPa |
| This Invention | (1) | 78.8 | 19.7 | 1.5 | 1800 | normal pressure | 99.8 | 502 | 626 | — |
| | (2) | 77.6 | 19.4 | 3 | 1600 | normal pressure | 96.5 | 555 | 652 | — |
| | (3) | 77.6 | 19.4 | 3 | 1820 | normal pressure | 96.3 | 552 | 632 | — |
| | (4) | 77.6 | 19.4 | 3 | 1800 | normal pressure | 99.1 | 565 | 673 | — |
| | (5) | 78.9 | 6.2 | 14.9 | " | normal pressure | 98.4 | 625 | 706 | — |
| | (6) | 72.0 | 18.0 | 10 | " | normal pressure | 99.2 | 659 | 675 | 930 |
| | (7) | 64.0 | 16.0 | 20 | " | normal pressure | 98.5 | 902 | 998 | 1145 |
| | (8) | 56.6 | 20.1 | 23.3 | " | normal pressure | 98.3 | 1035 | 867 | 1022 |
| | (9) | 56.0 | 14.0 | 30 | " | normal pressure | 98.2 | 1122 | — | 745 |
| | (10) | 40.0 | 10.0 | 50 | " | normal pressure | 98.0 | 1498 | — | 632 |
| | (11) | 30.0 | 10.0 | 60 | 1600 | 30 | 95.3 | 1578 | — | 620 |
| | (12) | 30.0 | 10.0 | 60 | 1900 | 70 | 98.7 | 1610 | — | 628 |
| | (13) | 30.0 | 10.0 | 60 | 1800 | 50 | 97.8 | 1604 | — | 625 |
| | (14) | 12.0 | 10.0 | 78 | " | " | 97.5 | 1715 | — | 619 |
| | (15) | 10.0 | 10.0 | 80 | " | " | 97.1 | 1821 | — | 603 |
| | (16) | 54.2 | 44.3 | 1.5 | " | normal pressure | 99.8 | 805 | 673 | — |
| | (17) | 53.3 | 43.7 | 3 | " | normal pressure | 99.7 | 842 | 781 | — |
| | (18) | 49.5 | 40.5 | 10 | " | normal pressure | 99.4 | 916 | 884 | 988 |
| | (19) | 30.0 | 60.0 | 10 | " | 50 | 97.6 | 1265 | — | 710 |
| | (20) | 10.0 | 80.0 | 10 | " | 50 | 97.4 | 1412 | — | 602 |
| Comparative Examples | (1) | 80.0 | 20.0 | 0 | " | normal pressure | 99.7 | 470 | 570 | — |
| | (2) | 8.0 | 10.0 | 82 | " | 50 | 95.6 | 1785 | — | 555 |
| | (3) | 81.0 | 0.0 | 19 | " | normal pressure | 99.7 | 545 | 471 | — |
| | (4) | 8.0 | 82.0 | 10 | " | 50 | 96.5 | 1408 | — | 562 |

As is clear from Table 1, when the alloy was manufactured by mixing the Mo₅SiB₂ powder and the TiCN5 powder into the Mo powder, the alloy in which the mixing ratio of the TiCN5 powder was 1 mass % or more and 25 mass % or less was excellent in 0.2% proof stress and room-temperature hardness compared to the alloy mixed with no TiCN5. That is, it was confirmed that the 0.2% proof stress and the hardness were improved by mixing TiCN5.

Further, the alloy in which the mixing ratio of the TiCN5 powder was more than 25 mass % and not more than 80 mass % was more excellent in room-temperature hardness compared to the alloy in which the mixing ratio of the TiCN5 powder was 25 mass % or less. That is, it was confirmed that the hardness was improved by increasing the mixing ratio of the TiCN5 powder.

On the other hand, it was seen that the alloy in which the mixing ratio of the TiCN5 powder was 82 mass % was reduced in hardness and thus that if the mixing ratio was too high, the volume ratio of Mo was lowered so that the function as the bonding material was reduced.

Example 2

A W powder, a Mo₅SiB₂ powder, and a TiCN5 powder were prepared as raw materials.

Specifically, the W powder had a purity of 99.99 mass % or more and an average grain size according to Fsss of 1.2 μm. As the Mo₅SiB₂ powder and the TiCN5 powder, the same powders as in Example 1 were used.

While the other manufacturing method was the same as in the case where the alloy was manufactured by mixing the 60 mass % or more Mo₅SiB₂ powder and the TiCN5 powder into the Mo powder in Example 1, heat-resistant alloys were manufactured by setting the sintering temperature to 1900° C.

Table 2 shows test results under respective conditions.

TABLE 2

| | | mixing of powders (mass %) | | | sintering | | alloy | | |
|---|---|---|---|---|---|---|---|---|---|
| | | | | | | | room-temperature hardness | 0.2% proof stress 1200° C., | bending strength 1200° C., |
| | | W | Mo₅SiB₂ | TiCN5 | temperature (° C.) | pressure MPa | Hv | MPa | MPa |
| This Invention | (1) | 87.5 | 11.6 | 0.9 | 1900 | 50 | 613 | 587 | — |
| | (2) | 83.0 | 11.0 | 6 | 1700 | 30 | 738 | — | 702 |
| | (3) | 83.0 | 11.0 | 6 | 2000 | 70 | 882 | — | 925 |
| | (4) | 83.0 | 11.0 | 6 | 1900 | 50 | 874 | — | 910 |
| | (5) | 71.1. | 13.4 | 15.5 | " | " | 1321 | — | 1005 |
| | (6) | 70.7 | 9.3 | 20 | " | " | 1434 | — | 716 |
| | (7) | 17.4 | 9.2 | 73.4 | " | " | 2315 | — | 597 |
| | (8) | 65.0 | 28.1 | 6.9 | " | " | 1209 | — | 939 |
| | (9) | 44.8 | 47.3 | 7.9 | " | " | 1599 | — | 685 |
| | (10) | 17.4 | 73.4 | 9.2 | " | " | 1779 | — | 595 |
| Comparative Examples | (1) | 88.3 | 11.7 | 0 | " | " | 553 | 495 | — |
| | (2) | 14.1 | 9.3 | 76.6 | " | " | 2245 | — | 527 |
| | (3) | 89.6 | 4.6 | 5.8 | " | " | 602 | 542 | — |
| | (4) | 14.1 | 76.6 | 9.3 | " | " | 1791 | — | 537 |

As is clear from Table 2, when the alloy was manufactured by mixing the Mo₅SiB₂ powder and the TiCN5 powder into the W powder, the alloy in which the mixing ratio of the TiCN5 powder was 0.5 mass % or more was more excellent in 0.2% proof stress or bending strength and room-temperature hardness compared to the alloy mixed with no TiCN5 powder. That is, it was confirmed that the 0.2% proof stress or the bending strength and the hardness were improved by mixing the TiCN5 powder.

On the other hand, it was seen that the alloy in which the mixing ratio of the TiCN5 powder was more than 75 mass % was reduced in hardness and thus that if the mixing ratio was too high, the volume ratio of W was lowered so that the function as the bonding material was reduced.

On the other hand, it was seen that the alloy in which the mixing ratio of the Mo₅SiB₂ powder was more than 75 mass % was reduced in hardness and thus that if the mixing ratio was too high, the volume ratio of W was lowered so that the function as the bonding material was reduced.

In particular, it was seen that when the W powder was used instead of Mo, there was an advantage in being excellent in properties at higher temperatures and that, as shown in Table 3, the hardness at 1000° C. and the 0.2% proof stress at 1400° C. largely exceeded those obtained when the Mo powder was used.

TABLE 3

| | | mixing of powders (mass %) | | | | alloy | | |
|---|---|---|---|---|---|---|---|---|
| | | | | | | hardness room-temperature | hardness 1000° C. | 0.2% proof stress 1400° C., |
| | | W | Mo | Mo₅SiB₂ | TiCN5 | Hv | Hv | MPa |
| This Invention | (1) | — | 72.0 | 18.0 | 10.0 | 659 | 317 | 265.3 |
| | (2) | 83.0 | — | 11.0 | 6.0 | 874 | 560 | 586.2 |

The alloy in which the mixing ratio of the Mo₅SiB₂ powder was 5 mass % or more was more excellent in 0.2% proof stress or bending strength and room-temperature hardness compared to the alloy in which the mixing ratio of the Mo₅SiB₂ powder was less than 5 mass %. That is, it was confirmed that the 0.2% proof stress or the bending strength and the hardness were improved by mixing the Mo₅SiB₂ powder.

Example 3

Next, alloys were manufactured and tested under the same conditions as in Example 1 except that the powder mixing ratio was 77.6 mass % Mo powder, 19.4 mass % Mo₅SiB₂ powder, and 3% TiCN5 powder, that there were prepared Mo₅SiB₂ powders having grain sizes of 0.07, 0.7, and 1.0 m²/g in BET value, and that the sintering temperature was set to 1800° C. Table 4 shows powder grain sizes and test results. Currently, it is difficult to manufacture a Mo₅SiB₂ powder outside a range of 0.07 to 1.0 in BET value. This is because a Mo₅SiB₂ powder is very hard and because the composition control is difficult in the case of coarse grains.

TABLE 4

| $Mo_5SiB_2$ raw material BET ($m^2$/g) | $Mo_5SiB_2$ average grain size (μm) | TiCN5 average grain size (μm) | relative density (—) | room-temperature hardness Hv | 0.2% proof stress 1200° C., MPa |
|---|---|---|---|---|---|
| 1.0 | 0.5 | 3 | 96.1 | 542 | 569 |
| 0.7 | 1 | 3 | 97.3 | 545 | 560 |
| 0.07 | 20 | 3 | 96.8 | 547 | 574 |

(This Invention)

As shown in Table 4, the average grain size of the $Mo_5SiB_2$ powder in the alloy of the sample which was sinterable was 0.5 μm to 20 μm.

From this result, it was seen that it was not possible to manufacture a heat-resistant alloy in which the average grain size of $Mo_5SiB_2$ was less than 0.5 μm or greater than 20 μm.

Example 4

Next, alloys were manufactured and tested under the same conditions as in Example 1 except that the powder mixing ratio was 77.6 mass % Mo powder, 19.4 mass % $Mo_5SiB_2$ powder, and 3% TiCN5 powder, that there were prepared TiCN5 powders having different powder grain sizes, and that the sintering temperature was set to 1800° C. Table 5 shows powder grain sizes and test results.

TABLE 5

| TiCN5 raw material average grain size (μm) | $Mo_5SiB_2$ average grain size (μm) | TiCN5 average grain size (μm) | relative density (—) | room-temperature hardness Hv | 0.2% proof stress 1200° C., MPa |
|---|---|---|---|---|---|
| 0.5 | 3.3 | 0.5 | 96.9 | 503 | 515 |
| 2.3 | 3.9 | 5.0 | 98.3 | 551 | 661 |
| 3.7 | 3.7 | 7.0 | 97.7 | 536 | 640 |
| 5.0 | 3.5 | 11 | 97.5 | 510 | 529 |
| 0.4 | | | non-sinterable | | |
| 6.0 | | | non-sinterable | | |

(This Invention / Comparative Example)

As is clear from Table 5, the average grain size of TiCN5 in the alloy which was sinterable was 0.5 to 11 μm.

From this result, it was seen that it was not possible to manufacture a heat-resistant alloy in which the average grain size of TiCN5 was less than 0.5 μm or greater than 11 μm.

Example 5

Next, alloys were manufactured in the same manner as in Example 1 except that the powder mixing ratio was 77.6 mass % Mo powder, 19.4 mass % $Mo_5SiB_2$ powder, and 3% TiCN5 powder. Then, the relationship between the ratio of the number of TiCN5 grains with grain sizes of 1.5 to 3.5 μm in TiCN5 grains in the alloy and the properties of the alloy was evaluated. Table 6 shows test conditions and test results. The ratio of the number of the TiCN5 grains of 1.5 to 3.5 μm was controlled by using titanium carbonitride powders (model numbers: 5MP15, 5MP30) manufactured by A.L.M.T. Corporation and classifying them for adjustment.

TABLE 6

| | alloy | | | | | | | |
|---|---|---|---|---|---|---|---|---|
| | $Mo_5SiB_2$ composition (mass %) | | average grain size | TiCN5 average grain size | 1.5-3.5 μm | relative density | room-temperature hardness | 0.2% proof stress 1200° C., |
| | Si | B | (μm) | (μm) | % | (—) | Hv | MPa |
| This Invention | 1.46 | 0.7 | 3.7 | 3.3 | 40 | 99.3 | 551 | 671 |
| | " | " | 4.0 | 3.3 | 60 | 98.9 | 547 | 669 |
| Comparative Example | " | " | 3.9 | 3.3 | 30 | 95.9 | 529 | 628 |
| | manufacture is difficult when TiCN5 1.5 to 3.5 μm is higher than 60% | | | | | | | |

As shown in Table 6, the alloy in which the ratio of the number of the TiCN5 grains with the grain sizes of 1.5 to 3.5 µm in the TiCN5 grains in the alloy was 40% or 60% was excellent in room-temperature hardness and 0.2% proof stress compared to the alloy of 30%.

A TiCN5 powder of higher than 60% is a powder with a highly uniform grain size and is difficult to obtain, leading to a disadvantage in terms of the manufacturing cost. Accordingly, the above-mentioned upper and lower limit range is preferable.

From this result, it was seen that the alloy in which the ratio of the number of the TiCN5 grains of 1.5 to 3.5 µm in the TiCN5 grains in the alloy was 40% to 60% was excellent in room-temperature hardness and 0.2% proof stress.

Example 6

Next, alloys were manufactured in the same manner as in Example 1 except that the powder mixing ratio was 77.6 mass % Mo powder, 19.4 mass % Mo$_5$SiB$_2$ powder, and 3% TiCN5 powder and that the sintering temperature was set to 1800° C. Then, the relationship between the ratios of the numbers of TiCN5 grains with grain sizes of 0.5 to 2.5 µm and 4.0 to 6.0 µm in TiCN5 grains in the alloy and the properties of the alloy was evaluated. Table 7 shows test conditions and test results. The ratio of the number of the TiCN5 grains of 0.5 to 2.5 µm and the ratio of the number of the TiCN5 grains of 4.0 to 6.0 µm were controlled by mixing together a TiCN5 powder with an average grain size of 1.5 µm and a TiCN5 powder with an average grain size of 5.0 µm and changing the mixing ratio of these raw material powders.

excellent in room-temperature hardness, 0.2% proof stress, and relative density compared to the alloy of 15% or 45%.

Likewise, the alloy in which the ratio of the number of the TiCN5 grains with the grain sizes of 4.0 to 6.0 µm in the TiCN5 grains in the alloy was 10% or 30% was excellent in room-temperature hardness, 0.2% proof stress, and relative density compared to the alloy of 5% or 35%.

From this result, it was seen that the alloy in which the ratio of the number of the TiCN5 grains with the grain sizes of 0.5 to 2.5 µm in the TiCN5 grains in the alloy was 20% to 40% and further the ratio of the number of the TiCN5 grains with the grain sizes of 4.0 to 6.0 µm in the TiCN5 grains in the alloy was 10% to 30% was excellent in room-temperature hardness, 0.2% proof stress, and relative density.

Example 7

Alloys were manufactured under the same conditions as in Example 1 except that sintered bodies with various powder mixing ratios were manufactured at a sintering temperature of 1800° C. Further, alloys were manufactured under the same conditions as in Example 1 except that, instead of normal pressure sintering and HIP in Example 1, sintering HIP was carried out at a temperature of 1600° C. at a pressure of 30 MPa. Table 8 shows results of comparing

TABLE 7

| | alloy | | | | | | |
|---|---|---|---|---|---|---|---|
| | Mo$_5$SiB$_2$ | TiCN5 | | | | room- | 0.2% proof |
| | average grain size (µm) | average grain size (µm) | 0.5-2.5 µm % | 4.0-6.0 µm % | relative density (—) | temperature hardness Hv | stress 1200° C., MPa |
| This Invention | 4.1 | 3.5 | 20 | 30 | 99.3 | 563 | 684 |
| | 3.9 | 2.2 | 40 | 10 | 99.5 | 569 | 692 |
| Comparative Example | 4.2 | 3.8 | 15 | 35 | 95.7 | 522 | 548 |
| | 4.0 | 1.9 | 45 | 5 | 98.7 | 538 | 632 |

As shown in Table 7, the alloy in which the ratio of the number of the TiCN5 grains with the grain sizes of 0.5 to 2.5 µm in the TiCN5 grains in the alloy was 20% or 40% was alloy densities, after sintering, after HIP, and after sintering HIP, of sintered bodies obtained by these manufacturing methods.

TABLE 8

| | | | | relative density % | | |
|---|---|---|---|---|---|---|
| | mixing of powders (mass %) | | | 1800° C. normal pressure sintering | 1800° C. normal pressure sintering --> 1600° C. HIP | 1600° C. sintering HIP |
| | Mo | MO$_5$SiB$_2$ | TiCN5 | | | |
| This Invention | 79.2 | 19.8 | 1 | 95.1 | 99.8 | 95.5 |
| | 77.6 | 19.4 | 3 | 93.2 | 99.1 | 94.2 |
| | 54.4 | 44.6 | 1 | 95.4 | 99.8 | 95.6 |
| | 53.3 | 43.7 | 3 | 94.9 | 99.7 | 95.3 |
| | 52.2 | 42.8 | 5 | 92.5 | 99.5 | 94.0 |

As is clear from Table 8, any of the alloys was increased in relative density after the HIP than after the sintering and thus it was seen that, by combining the sintering and the HIP, it was possible to increase the density of the alloy while suppressing the sintering temperature. Further, it was seen that, only by the low-temperature sintering HIP, it was possible to obtain the alloy with approximately the same relative density as that obtained by the normal pressure sintering.

Example 8

Next, alloys were manufactured and tested under the same conditions as in Example 1 except that the powder mixing ratio was 77.6 mass % Mo powder, 19.4 mass % $Mo_5SiB_2$ powder, and 3% titanium carbonitride powder, that there were prepared TiCN3, TiCN5, and TiCN7 as titanium carbonitride powders, and that the sintering temperature was set to 1800° C. Table 9 shows powder grain sizes and test results.

TABLE 9

| | mixing of powders | | | alloy | | | | |
|---|---|---|---|---|---|---|---|---|
| | | | titanium | average grain size (μm) | | relative | room-temperature | 0.2% proof stress |
| | Mo (mass %) | $Mo_5SiB_2$ (mass %) | carbonitride (mass %) | $Mo_5SiB_2$ | titanium carbonitride | density (—) | hardness Hv | 1200° C., MPa |
| This Invention | 77.6 | 19.4 | TiCN5 3 | 3.5 | 3.1 | 99.1 | 565 | 673 |
| | " | " | TiCN3 3 | " | " | 99.3 | 550 | 662 |
| | " | " | TiCN7 3 | " | " | 99.1 | 578 | 685 |

As a result, TiCN3 and TiCN7 each made it possible to obtain approximately the same room-temperature hardness and 0.2% proof stress as those obtained with TiCN5.

Example 9

Among the above-mentioned products of this invention, X-ray diffraction was carried out under the following conditions with respect to the alloy manufactured with the 49.5 mass % Mo powder, the 40.5 mass % $Mo_5SiB_2$ powder, and the 10 mass % TiCN5 powder (see Example 1). Specific conditions were as follows.

Apparatus: X-ray diffraction apparatus (model number: RAD-IIB) manufactured by Rigaku Corporation
Vessel: Cu (KαX-ray diffraction)
Opening Angle of Divergence Slit and Scattering Slit: 1°
Opening Width of Receiving Slit: 0.3 mm
Opening Width of Receiving Slit for Monochromator: 0.6 mm
Tube Current: 30 mA
Tube Voltage: 40 kV
Scanning Speed: 1.0°/min
The results are shown in FIG. 6.

Figure 6:
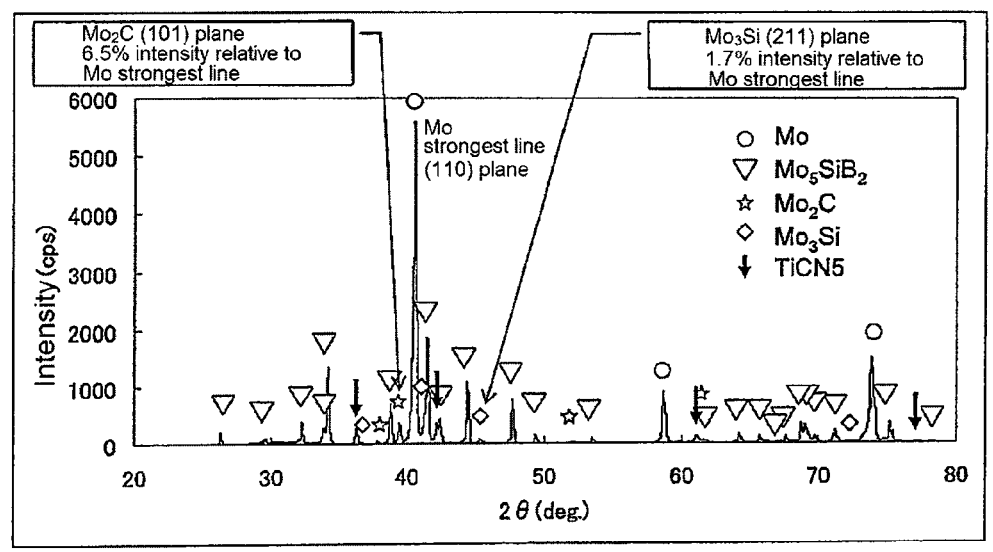
FIG. 6 is a diagram showing the X-ray diffraction results of a heat-resistant alloy according to an Example of this invention.

As shown in FIG. 6, peaks due to $Mo_2C$ and $Mo_3Si$ as inevitable compounds were observed, wherein the $Mo_2C$ (101) peak intensity was 6.5% and the $Mo_3Si$ (211) peak intensity was about 1.7% relative to the Mo strongest line peak (110) intensity.

Accordingly, it was seen that if the content of the inevitable compounds was as low as this level, the inevitable compounds did not affect the room-temperature hardness and the high-temperature 0.2% proof stress, which were the function and effect of this invention.

INDUSTRIAL APPLICABILITY

While this invention has been described with reference to the embodiment and the Examples, this invention is not limited thereto.

It is apparent that those skilled in the art can think of various modifications and improvements in the scope of this invention and it is understood that those also belong to the scope of this invention.

For example, while, in the above-mentioned embodiment, the description has been given of the case where the heat-resistant alloy is applied to the friction stir welding tool, this invention is by no means limited thereto and is applicable to a heat-resistant member for use in a high-temperature environment, such as a glass melting jig tool, a high-temperature industrial furnace member, a hot extrusion die, a seamless tube manufacturing piercer plug, an injection molding hot runner nozzle, a casting insert mold, a resistance heating deposition container, an airplane jet engine, or a rocket engine.

DESCRIPTION OF SYMBOLS 101 friction stir welding tool
102 shank
103 shoulder portion
104 pin portion

The invention claimed is:
1. A heat-resistant alloy comprising:
a first phase comprising a Mo or W metal phase,
a second phase comprising a Mo—Si—B-based alloy, and
a third phase comprising a titanium carbonitride phase,
wherein the balance is an inevitable compound and an inevitable impurity,
wherein a composition of the titanium carbonitride is expressed by $TiC_xN_{1-x}$ (x=0.3 to 0.7),
wherein titanium carbonitride grains in the alloy have an average grain size of 0.5 μm or more and 11 μm or less, and
wherein a ratio of the number of titanium carbonitride grains with grain sizes of 0.5 to 2.5 μm in the alloy is 20 to 40% of all titanium carbonitride grains in the alloy and a ratio of the number of titanium carbonitride grains with grain sizes of 4.0 to 6.0 μm in the alloy is 10 to 30% of all the titanium carbonitride grains in the alloy, and
wherein the distribution of titanium carbonitride grains in the alloy has two peak values, a peak value between 0.5 and 2.5 μm and a peak value between 4.0 and 6.0 μm.

2. The heat-resistant alloy according to claim 1, wherein the Mo—Si—B-based alloy is composed mainly of $Mo_5SiB_2$.

3. The heat-resistant alloy according to claim 1, wherein the first phase is the Mo metal phase and the content of the titanium carbonitride is 1 mass % or more and 80 mass % or less.

4. The heat-resistant alloy according to claim 1, wherein the first phase is the Mo metal phase and the content of the titanium carbonitride is 3 mass % or more and 25 mass % or less.

5. The heat-resistant alloy according to claim 1, wherein the first phase is the W metal phase and the content of the titanium carbonitride is 0.5 mass % or more and 75 mass % or less.

6. The heat-resistant alloy according to claim 1, wherein the first phase is the W metal phase and the content of the titanium carbonitride is 5 mass % or more and 16 mass % or less.

7. The heat-resistant alloy according to claim 1, wherein the first phase is the Mo metal phase and the content of the Mo—Si—B-based alloy is 5 mass % or more and 80 mass % or less.

8. The heat-resistant alloy according to claim 1, wherein the first phase is the Mo metal phase and the content of the Mo—Si—B-based alloy is 10 mass % or more and 60 mass % or less.

9. The heat-resistant alloy according to claim 1, wherein the first phase is the W metal phase and the content of the Mo—Si—B-based alloy is 5 mass % or more and 75 mass % or less.

10. The heat-resistant alloy according to claim 1, wherein the first phase is the W metal phase and the content of the Mo—Si—B-based alloy is 10 mass % or more and 30 mass % or less.

11. The heat-resistant alloy according to claim 1, wherein titanium carbonitride grains in the alloy have an average grain size of 0.5 μm or more and 7 μm or less.

12. The heat-resistant alloy according to claim 1, wherein titanium carbonitride grains in the alloy have an average grain size of 0.5 μm or more and 5 μm or less.

13. The heat-resistant alloy according to claim 1, wherein the Mo—Si—B-based alloy in the alloy has an average grain size of 0.5 μm or more and 20 μm or less.

14. The heat-resistant alloy according to claim 1, having a Vickers hardness of 500 Hv or more at 20° C. and a 0.2% proof stress of 500 MPa or more at 1200° C.

15. The heat-resistant alloy according to claim 1, having a Vickers hardness of 900 Hv or more at 20° C. and a bending strength of 600 MPa or more at 1200° C.

16. A friction stir welding tool using the heat-resistant alloy according to claim 1.

17. A friction stir welding tool having, on a surface of the friction stir welding tool according to claim 16, a coating layer made of at least one or more kinds of elements selected from the group consisting of Group IVa elements, Group Va elements, Group VIa elements, Group IIIb elements, and Group IVb elements other than C of the Periodic Table or a carbide, a nitride, or a carbonitride of at least one or more kinds of elements selected from the element group.

18. A friction stir apparatus comprising the friction stir welding tool according to claim 16.

19. A method of manufacturing the heat-resistant alloy according to claim 1, comprising:
 mixing together a Mo powder, a Mo—Si—B-based compound powder, and a titanium carbonitride powder;
 compression-molding at room temperature a mixed powder obtained by the mixing;
 heating a compact, obtained by the molding step, at 1600° C. or more and 1820° C. or less in a reduced-pressure atmosphere containing at least nitrogen, thereby sintering the compact; and
 hot-isostatic-pressing in an inert atmosphere a sintered body obtained by sintering.

20. A method of manufacturing the heat-resistant alloy according to claim 1, comprising:
 mixing together a Mo powder, a Mo—Si—B-based alloy powder, and a titanium carbonitride powder;
 compression-molding at room temperature a mixed powder obtained by the mixing; and
 hot-isostatic-pressing in an inert atmosphere a compact obtained by the molding thereby pressure sintering the compact.

21. A method of manufacturing the heat-resistant alloy according to claim 1, comprising:
 mixing together a Mo powder, a Mo—Si—B-based alloy powder, and a TiCN5 powder; and
 sintering, while pressing a mixed powder, obtained by the mixing, at 30 MPa or more and 70 MPa or less in a reduced-pressure atmosphere, an atmosphere containing at least hydrogen, or an inert atmosphere, heating the mixed powder at 1600° C. or more and 1900° C. or less.

22. A method of manufacturing the heat-resistant alloy according to claim 1, comprising:
 mixing together a W powder, a Mo—Si—B-based alloy powder, and a titanium carbonitride powder; and
 sintering, while pressing a mixed powder, obtained by the mixing, at 30 MPa or more and 70 MPa or less in a reduced-pressure atmosphere, an atmosphere containing at least hydrogen, or an inert atmosphere, heating the mixed powder at 1700° C. or more and 2000° C. or less.

* * * * *